(12) United States Patent
Breen et al.

(10) Patent No.: US 10,384,259 B2
(45) Date of Patent: *Aug. 20, 2019

(54) STOCK EJECTOR ASSEMBLY (71) Applicant: STANDARD LIFTERS, INC., Grand Rapids, MI (US)

(72) Inventors: Scott M. Breen, Marne, MI (US); Joel T. Pyper, Grand Rapids, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 590 days.

This patent is subject to a terminal disclaimer.

(21) Appl. No.: 15/164,938

(22) Filed: May 26, 2016

(65) Prior Publication Data

US 2016/0263642 A1    Sep. 15, 2016

Related U.S. Application Data

(63) Continuation of application No. 14/674,296, filed on Mar. 31, 2015, now Pat. No. 9,375,777.

(Continued)

(51) Int. Cl.
| | |
|---|---|
| *B21D 45/02* | (2006.01) |
| *B23P 15/24* | (2006.01) |
| *B21D 45/10* | (2006.01) |
| *B21D 45/00* | (2006.01) |
| *B21D 43/04* | (2006.01) |

(Continued)

(52) U.S. Cl.
CPC ............ *B21D 45/02* (2013.01); *B21D 22/06* (2013.01); *B21D 37/08* (2013.01); *B21D 43/04* (2013.01); *B21D 43/05* (2013.01); *B21D 45/003* (2013.01); *B21D 45/006* (2013.01); *B21D 45/10* (2013.01); *B23P 15/24* (2013.01)

(58) Field of Classification Search
CPC ........ B21D 45/02; B21D 37/08; B21D 43/04; B21D 43/05; B21D 45/003; B21D 45/006; B21D 45/10; B21D 22/06; B23P 15/24
USPC .......................................................... 72/344
See application file for complete search history.

(56) References Cited

U.S. PATENT DOCUMENTS

| | | | |
|---|---|---|---|
| 2,168,377 | A | 8/1939 | Wales |
| 3,335,627 | A | 8/1967 | Smelts |

(Continued)

FOREIGN PATENT DOCUMENTS

| | | |
|---|---|---|
| JP | 56084130 | 9/1981 |
| JP | 56122634 | 9/1981 |

(Continued)

OTHER PUBLICATIONS

Standard Lifters Inc., "Pilot Assembly" sales brochure, Grand Rapids, MI (Oct. 2011), 15 pages.

(Continued)

*Primary Examiner* — David B Jones
(74) *Attorney, Agent, or Firm* — Price Heneveld LLP (57) ABSTRACT

A stock ejector assembly and method for metal forming dies includes a stock ejector with a large spring and a ring-style stripper. The ring-style stripper provides a larger surface area for contacting the stock. The large compression spring is preloaded and when a load is applied, the stripper retracts and the spring pressure increases. When the dies separate, the stock ejector pushes the part off flat surfaces, separating surfaces sealed by adhesion, including but not limited to oil or lubricant adhesion.

20 Claims, 10 Drawing Sheets

Related U.S. Application Data (60) Provisional application No. 61/985,834, filed on Apr. 29, 2014.

(51) Int. Cl.
  *B21D 43/05* (2006.01)
  *B21D 37/08* (2006.01)
  *B21D 22/06* (2006.01)

(56) References Cited

U.S. PATENT DOCUMENTS

| | | | |
|---|---|---|---|
| 3,620,113 | A | 11/1971 | Gargrave |
| 3,998,369 | A | 12/1976 | Grosjean et al. |
| 4,342,214 | A | 8/1982 | Neuendorf |
| 4,424,639 | A | 1/1984 | Richardson |
| 4,644,836 | A | 2/1987 | Wepner |
| 4,916,931 | A | 4/1990 | Kaeseler |
| 4,945,749 | A | 8/1990 | Walker et al. |
| 5,722,280 | A | 3/1998 | Bodnar |
| 5,860,315 | A | 1/1999 | Sawdon |
| 7,581,475 | B2 | 9/2009 | Moellering |
| 7,694,399 | B2 | 4/2010 | Sawdon et al. |
| 7,913,369 | B2 | 3/2011 | Gakovic |
| 8,151,619 | B2 | 4/2012 | Pyper et al. |
| 8,844,335 | B2 | 9/2014 | Pyper et al. |
| 8,950,233 | B2 | 2/2015 | Pyper et al. |
| 8,955,364 | B2 | 2/2015 | Breen et al. |
| 9,067,253 | B2 | 6/2015 | Pyper et al. |
| 9,375,777 | B2 * | 6/2016 | Breen .................. B21D 37/08 |
| 2006/0193937 | A1 | 8/2006 | Gakovic |
| 2009/0044671 | A1 | 2/2009 | Greenleaf |
| 2009/0193865 | A1 | 8/2009 | Pyper et al. |
| 2013/0091920 | A1 | 4/2013 | Breen et al. |
| 2013/0167612 | A1 | 7/2013 | Breen et al. |
| 2013/0255350 | A1 | 10/2013 | Schneider et al. |

FOREIGN PATENT DOCUMENTS

| | | |
|---|---|---|
| JP | 57100825 | 6/1982 |
| JP | 06142788 | 5/1994 |
| KR | 1020010069897 | 7/2001 |
| KR | 1020060104028 | 10/2006 |
| KR | 100766072 | 10/2007 |

OTHER PUBLICATIONS

Standard Lifters Inc., "Pilot Sleeve" sales brochure, Grand Rapids, MI (Jan. 2012), 18 pages.
Fibro Inc., "Pilot Units to Daimler Standards" catalog p. E72, Rockford, IL (date unknown).
Dayton Progress Corporation, "Regular Pilots" catalog, pp. 9, 11, 13, Dayton, OH (date unknown).
Ajacs Die Sales Corporation, Pilot Retainer sales brochure, Grand Rapids, MI (date unknown).
Misumi Corporation, "Pilot Punches" catalog, pp. 202, 220, 228, 234, 242, 946, 948, Schaumberg, IL (date unknown).
Modern Die Systems Inc., "Die Accessories" sales brochure, Ellwood IN (date unknown), 1 page.

\* cited by examiner

STOCK EJECTOR ASSEMBLY

CROSS REFERENCE TO RELATED APPLICATION AND CLAIM TO PRIORITY

The present application is a continuation of commonly assigned U.S. patent application Ser. No. 14/674,296 filed on Mar. 31, 2015, now U.S. Pat. No. 9,375,777, issued Jun. 28, 2016, which claims the priority benefits under the provisions of 35 U.S.C. § 119, basing said claim of priority on related U.S. Provisional Application No. 61/985,834 filed Apr. 29, 2014.

BACKGROUND OF THE INVENTION

The present invention relates to metal forming dies and the like, and in particular to a stock ejector assembly and associated method incorporating a unique stock ejector assembly.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one-of-a-kind assemblies for a particular part, with each of the various components being handcrafted and custom mounted or fitted in an associated die set, which is in turn positioned in a stamping press. Not only are the punches and the other forming tools in the die set individually designed and constructed, but the other parts of the die set, such as stock lifters, guides, end caps and keepers, cam returns, etc., are also custom designed, and installed in the die set. Current die making processes require carefully machined, precision holes and recesses in the die set for mounting the individual components, such that the same are quite labor intensive, and require substantial lead time to make, test and set up in a stamping press. Consequently, such metal forming dies are very expensive to design, manufacture and repair or modify.

A liquid, such as a lubricant, mill oil or water may be used on the stock and one or more of the die parts to decrease the wear on the die parts and/or damage to the stock. When a liquid is used on the stock or upper and/or lower die parts of a metal forming die, the stock has a tendency to stick to the die parts. Thus, something must be done to break the lubricant tension/adhesion on the stock so that it can be removed from that portion of the die. In addition, tension/adhesion can also exist between the stock and flat surfaces on the dies whether or not a liquid is used with the stock and/or dies. Such adhesion between flat surfaces also requires the breaking of the developed tension. One way of breaking the tension is to use a threaded spring plunger. This is a self-contained assembly that includes a very small diameter spring which is prone to fail quickly due to its size. When the threaded spring plunger fails, it is a hassle for stampers as they have to continuously replace the threaded spring plungers. Another problem is that the threaded spring plungers typically have a pointed tip that can leave a mark on the stock if the spring pressure is too great.

Figure 18:
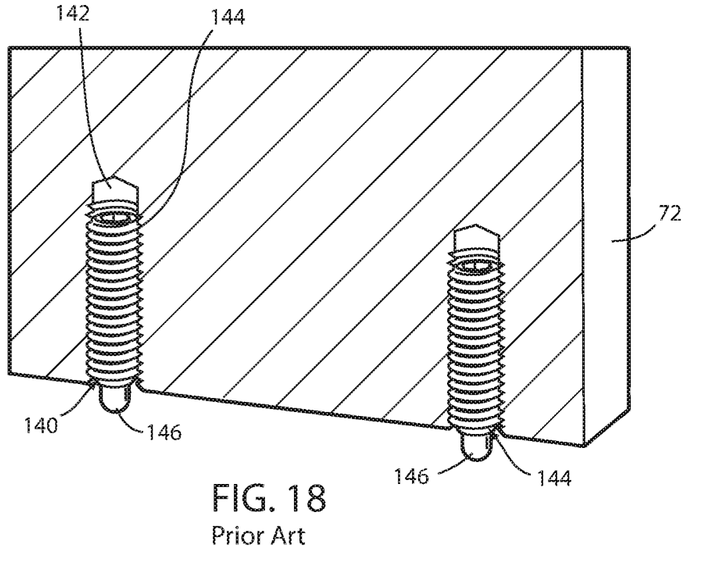
FIG. 18 is a schematic cross-sectional view of prior art spring plungers installed in a die member.
Figure 19:
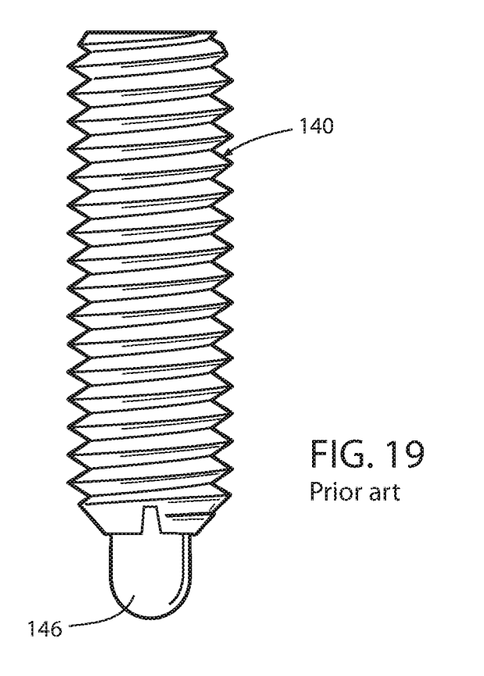
FIG. 19 is a perspective view of a prior art spring plunger.

FIGS. 18-21 illustrate two well-known prior art assemblies. For example, FIG. 18 illustrates the upper die member 72 of a die set with spring plungers 140. The spring plunger 140 includes a spring portion and a tip 146. The spring is received in an aperture 142 in the die member 72 such that the threaded surface 144 of the aperture 142 corresponds to the contours of the spring plunger 140. Such spring plungers 140 typically fail due to the small spring, which effects the overall lifespan of the spring plunger. The tip 146 has a small contact point that can mark the stock material. In addition, due to the small surface area of the tip 146, the spring plunger 140 can have trouble breaking the lubricant tension/adhesion on the stock strip. As illustrated in FIG. 18, the insertion of spring plunger 140 into die member 72 can be a difficult assembly, as the aperture 142 needs to be threaded 144 to correspond to the shape of the spring plunger 140.

Figure 20:
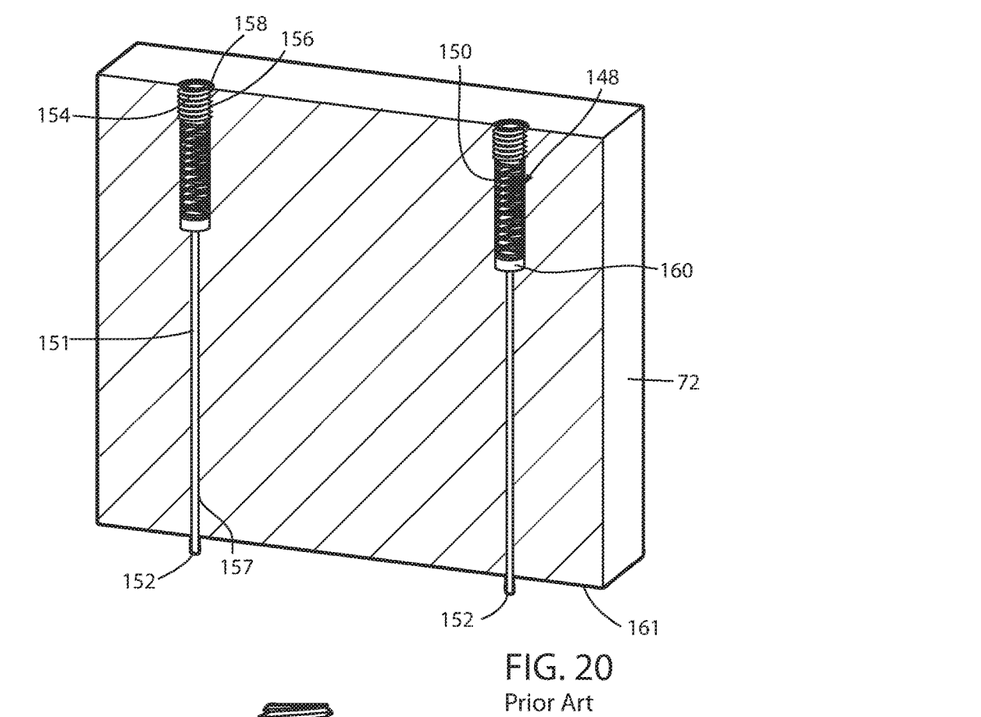
FIG. 20 is a schematic cross-sectional view of prior art ejector pin assemblies in a die member.
Figure 21:
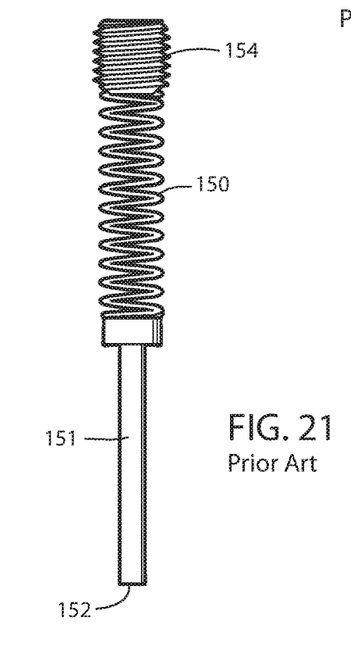
FIG. 21 is a perspective view of a prior art ejector pin assembly.

Another example of the prior art includes ejector pin assemblies 148, as shown in FIGS. 20 and 21. The ejector pins 148 include a pin 151 with a tip 152 that extends through a hole 157 in the bottom surface 161 of the die member 72. Another hole 158 includes a threaded portion 156 that mates with a set screw 154 of the ejector assembly 148. A spring 150 is received in hole 158 in between the set screw 154 and the head 160 of the pin 151. The spring 150 pushes the head 160 of the pin 151 such that the tip 152 of the pin 151 can extend from the underside 161 of the die member 72. Use of the ejector pins 148 requires costly machining as the die member 72 must receive several small parts. Small holes must be drilled for the pin 151 of the ejector pin assembly 148. The die member 72 has to be counter-bored and tapped for the set screw 154. In addition, the components of the ejector pin assemblies 148 are small components and require an immense amount of time to assemble.

The need for an improved stock ejector thus stems from the issues that metal stamping producers and die shops have long had when creating an "oil breaker" setup in their dies. The improved stock ejector addresses two main items that are currently problematic: The first is that it utilizes a large spring, which provides a much longer product life than a traditional spring plunger. The large spring is on the "exterior" of the assembly and the other construction methods are internal. This design provides the ability for a large spring to be used while keeping the overall footprint of the assembly as small as possible. The second is the increase in surface area that makes contact with the stock. Typical plunger "point" style on spring plungers have very little surface area, and most commonly used are the points that are rounded/spherical. This provides very little contact with the stock and it can leave a "mark" if the spring pressure compared to the contact surface area on the stock are not proper. The improved stock ejector utilizes a "ring" style stripper, which provides more overall surface area in contact with the stock. This amount of contact surface area prevents the stock from being "marked" but is also not so high that the stock wants to stick to it.

Thus, a product that solves these problems would be advantageous and is described herein.

SUMMARY OF THE INVENTION

One aspect of the present invention is a stock ejector assembly that utilizes a large spring, thereby providing a longer product life. The spring is on the "exterior" of the assembly, allowing for a large spring to be used while keeping the overall footprint of the assembly as small as possible. Another aspect of the present invention is to provide a stock ejector assembly that has an increased surface area that makes contact with the stock. Thus, the present invention includes a "ring" style stripper which provides a larger surface area to contact the stock. The increased contact surface area prevents the stock from being "marked" and prevents the stock from sticking to the ejector.

Yet another aspect of the present invention is a multi-station progressive metal forming die having at least two mutually converging and diverging die members between which an elongate stock strip is shifted longitudinally to form parts from the stock strip, along with an improved stock ejector assembly. The stock ejector assembly includes a stripper with an outer collar portion with an outer end surface oriented toward the stock strip, having a generally cylindrical first sidewall with a first outer diameter. The stripper also has an inner collar portion with an inner end surface oriented away from the stock strip, having a generally cylindrical second sidewall with a second outer diameter which is less than the first outer diameter of the first sidewall of the outer collar portion to define an annularly shaped, radially oriented shoulder therebetween. The outer collar portion of the stripper also has a first inner diameter, and the inner collar portion has a second inner diameter which is less than the first inner diameter of the outer collar portion to define an annularly shaped, radially oriented inner shoulder therebetween. A ring-shaped surface is formed on the stripper for contacting the stock strip. The stock ejector assembly includes a flange nut having a generally cylindrical outer end portion oriented toward the stock strip, an inner end portion that is oriented away from the stock strip, and a fastener aperture extending from the outer end portion through the inner end portion. The stock ejector assembly also has a spring member with a generally hollow interior that is received over the outer end portion of the flange nut and the inner collar portion of the stripper. The outer end of the spring member is oriented toward the stock strip and engages the radially oriented shoulder of the stripper. The opposite inner end of the spring member is oriented away from the stock strip and engages a surface of the inner end portion of the flange nut. A fastener secures the stock ejector assembly to one of the die members.

Yet another aspect of the present invention is a stock ejector assembly for metal forming dies that have least two mutually converging and diverging die members to form parts from the stock strip. The stock ejector assembly includes a stripper with an outer collar portion having an outer end surface oriented toward the stock strip with a generally cylindrical first sidewall with a first outer diameter. The stripper also has inner collar portion with an inner end surface oriented away from the stock strip, having a generally cylindrical second sidewall with a second outer diameter which is less than the first outer diameter of the first sidewall of the outer collar portion to define an annularly shaped, radially oriented shoulder therebetween. The outer collar portion of the stripper also has a first inner diameter, and the inner collar portion has a second inner diameter which is less than the first inner diameter of the outer collar portion to define an annularly shaped, radially oriented inner shoulder therebetween. A ring-shaped surface is formed on the stripper for contacting the stock strip. The stock ejector assembly includes a flange nut having a generally cylindrical outer end portion that is oriented toward the stock strip, an inner end portion that is oriented away from the stock strip, and a fastener aperture extending from the outer end portion through the inner end portion. The stock ejector assembly also includes a spring member having a generally hollow interior that is received over the outer end portion of the flange nut and the inner collar portion of the stripper. The spring member has an outer end oriented toward the stock strip that engages the radially oriented shoulder of the stripper, and an opposite inner end oriented away from the stock strip that engages a surface of the inner end portion of the flange nut. The stock ejector assembly includes a fastener that can be used to secure the stock ejector assembly to a die member.

Yet another aspect of the present invention is a method for making a multi-station progressive metal forming die having at least two mutually converging and diverging die members between which an elongate stock strip is shifted longitudinally to form parts from the stock strip, with the improvement of at least one stock ejector assembly. The method includes forming a stripper with an outer collar portion with an outer end surface oriented toward the stock strip with a generally cylindrical first sidewall having a first outer diameter, an inner collar portion with an inner end surface oriented away from the stock strip with a generally cylindrical second sidewall having a second outer diameter which is less than the first outer diameter of the first sidewall of the outer collar portion to define an annularly shaped, radially oriented shoulder therebetween. The method includes forming the outer collar portion with a first inner diameter and the inner collar portion with a second inner diameter which is less than the first inner diameter of the outer collar portion to define an annularly shaped, radially oriented inner shoulder therebetween. The method includes forming an aperture in the inner collar portion of the stripper. The method includes selecting a flange nut with a generally cylindrical outer end portion that is oriented toward the stock strip, an inner end portion that is oriented away from the stock strip, and a fastener aperture extending from the outer end portion through the inner end portion. The method includes selecting a spring member with a generally hollow interior, an outer end oriented toward the stock strip with an opposite inner end oriented away from the stock strip. The method includes inserting the spring member over the outer end portion of the flange nut and the inner collar portion of the stripper such that the outer end of the spring member engages the radially oriented outer shoulder of the stripper and the inner end of the spring member engages a surface of the inner end portion of the flange nut. The method includes selecting a fastener with a head having an outer end portion oriented toward the stock strip and an inner end portion oriented away from the stock strip and a threaded shank portion that extends from the inner end portion of the head of the fastener. The method includes inserting the fastener through the fastener aperture in the flange nut, and securing the stock ejector assembly to one die member by securing the fastener into a threaded aperture formed in the one die member.

These and other advantages of the invention will be further understood and appreciated by those skilled in the art by reference to the following written description, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in FIGS. 1-17, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 11:
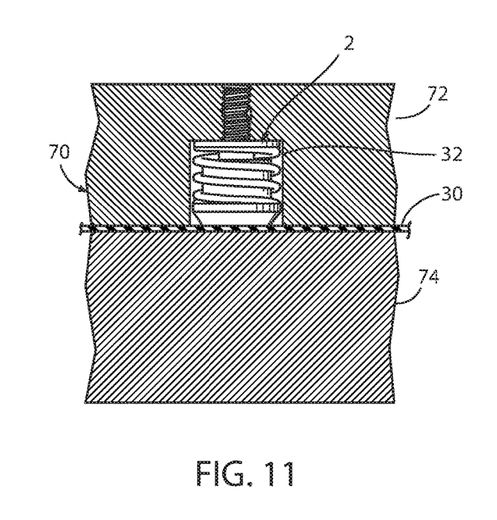
FIG. 11 is a perspective view of the stock ejector assembly installed in an upper die member.
Figure 12:
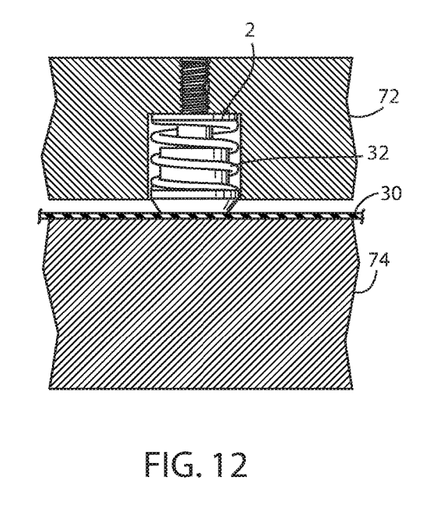
FIG. 12 is a perspective view of the stock ejector assembly installed in an upper die member as the stock is being separated from the upper die member.
Figure 13:
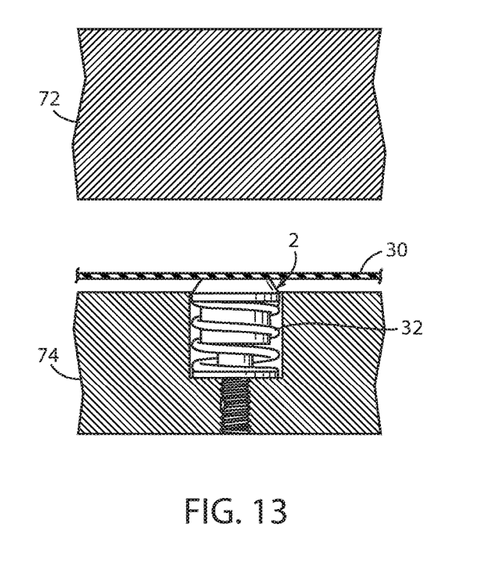
FIG. 13 is a perspective view of the stock ejector assembly installed on a lower die member showing the stock being separated from the lower die member.

The reference numeral 2 (FIGS. 1-13) generally designates a stock ejector assembly embodying an aspect of the present invention. As shown in FIGS. 11-13, the stock ejector assembly 2 is particularly adapted for use in conjunction with a multi-stage progressive metal forming die 70 having at least two mutually converging and diverging die members 72 and 74, between which an elongated stock strip 30 is shifted longitudinally form parts from the stock strip.

Figure 1:
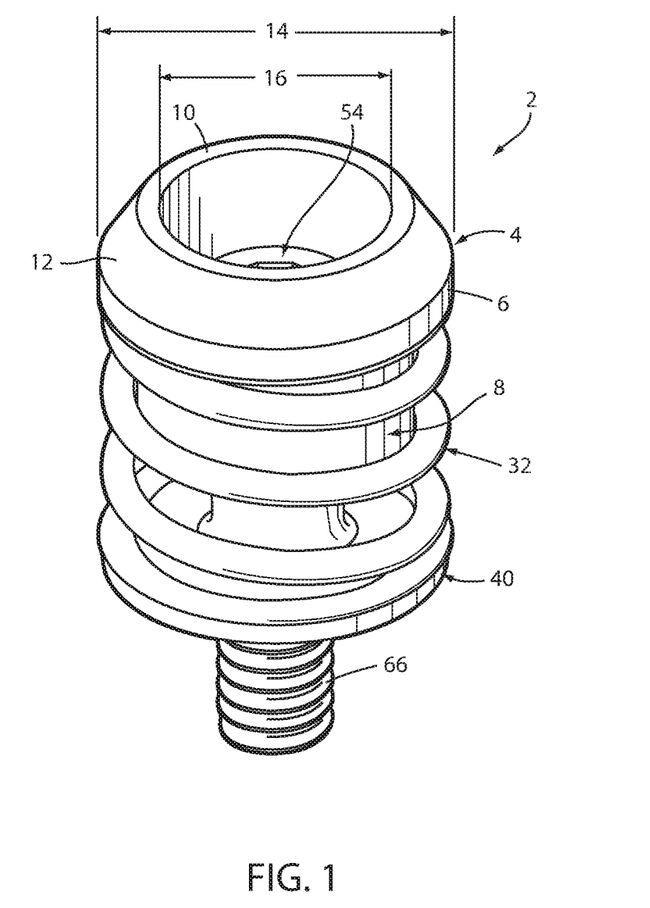
FIG. 1 is a perspective view of the stock ejector assembly embodying the present invention.
Figure 2:
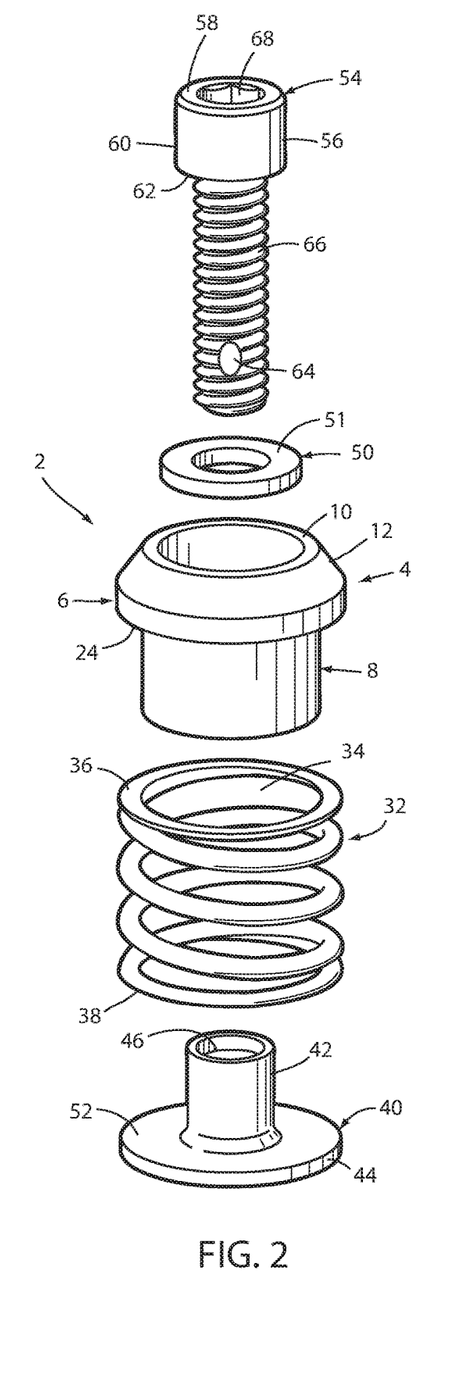
FIG. 2 is an exploded perspective view of the stock ejector assembly shown in FIG. 1.
Figure 3:
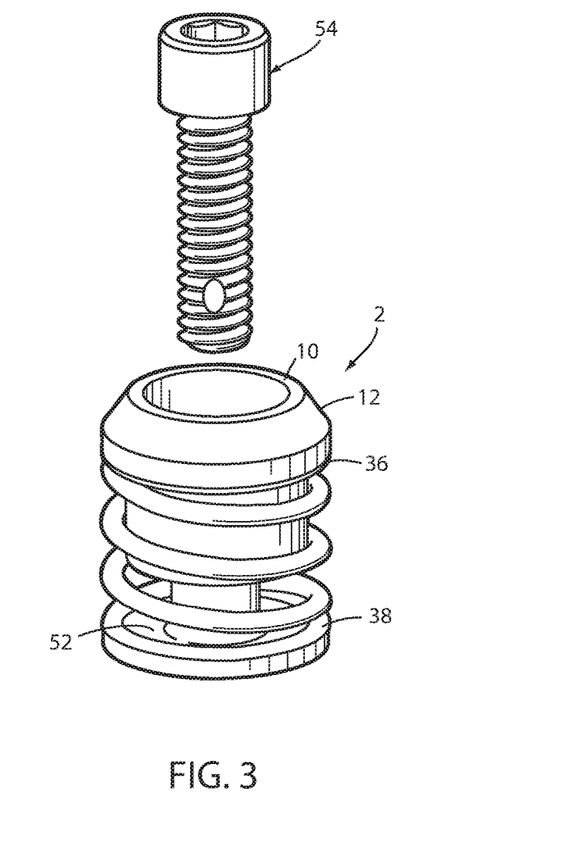
FIG. 3 is an exploded perspective view of a partially assembled stock ejector assembly, as shown in FIG. 1.

The stock ejector assembly 2 includes a stripper 4, a spring member 32, a flange nut 40, a fastener 54, and optionally a washer 50, as shown in FIGS. 1-3.

The stripper 4 has an outer collar portion 6 oriented toward the stock strip 30, and an oppositely disposed inner collar portion 8 oriented away from the stock strip 30. The outer collar portion 6 of the stripper 4 includes a generally ring-shaped outer end 10 that engages the stock strip 30, as shown in FIGS. 7-13.

Figure 4:
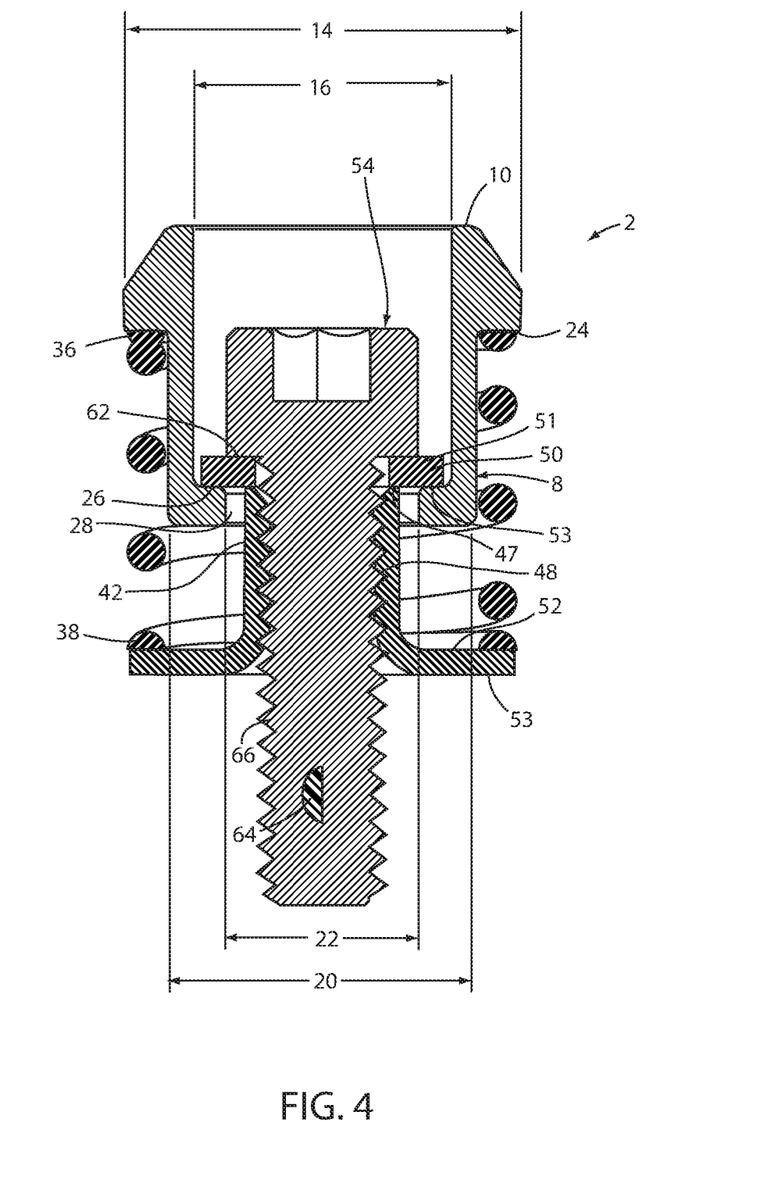
FIG. 4 is a vertical cross-sectional view of the stock ejector assembly of FIG. 1.

As illustrated in FIG. 4, the outer collar 6 of the stripper 4 has an outside diameter 14 (first outer diameter) and an inside diameter 16 (first inner diameter). In addition, the outer collar 6 can include a tapered surface 12 that tapers from the outer diameter 14 of the outer collar 6 to the ring-shaped outer end 10 of stripper 4. The inner collar 8 of the stripper 4 has an outside diameter 20 (second outer diameter) and an inside diameter 22 (second inner diameter). The outer diameter 14 of the outer collar 6 is larger than the outer diameter 20 of the inner collar 8 forming an outer, annularly shaped, radially oriented shoulder 24. The inside diameter 16 of the outer collar portion 6 of stripper 4 is greater than the inside diameter 22 of the inner collar 8 creating an inner, annularly shaped, radially oriented shoulder 26.

The spring member 32 includes a hollow interior 34, as shown in FIG. 2. The spring member 32 also has an outer end 36 that is oriented toward the stock strip 30 and an inner end 38 that is oriented away from the stock strip 30, as shown in FIG. 7.

Figure 7:
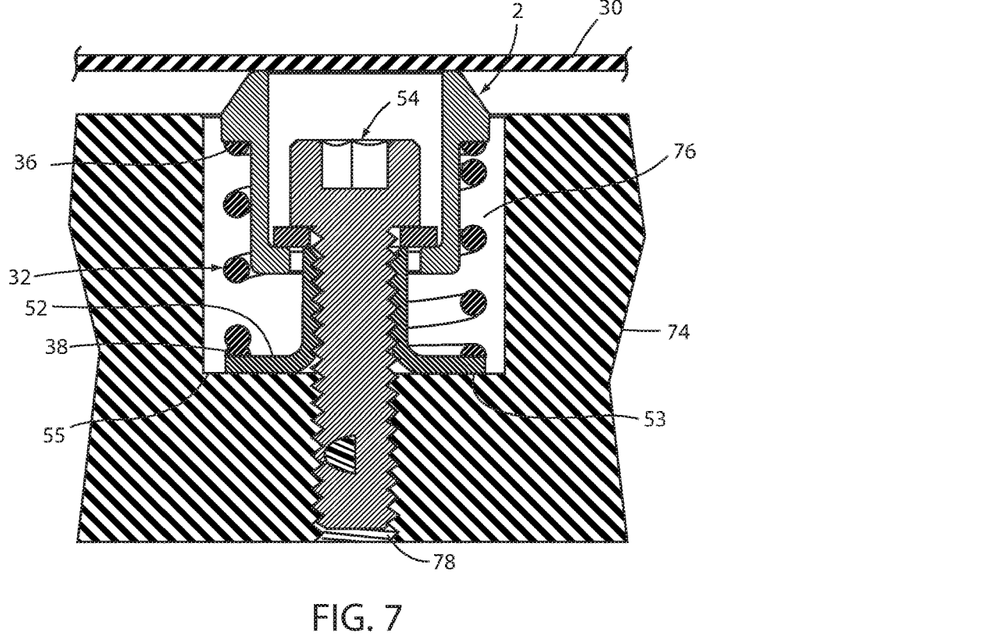
FIG. 7 is a vertical cross-sectional view of the stock ejector assembly installed in a lower die member.

The flange nut 40 includes an outer collar 42 that is oriented toward the stock strip 30, an inner collar 44 that is oriented away from the stock strip 30, and a fastener aperture 46 extending through the center of the flange nut 40, as shown in FIG. 7. The fastener aperture 46 can include a threaded shank portion 48, as shown in FIG. 4. The inner collar 44 of flange nut 40 includes a generally flat outer surface 52 that is oriented toward the stock strip 30 and a generally flat surface 53 (FIGS. 4 and 7) oriented away from the stock strip 30 that will engage a surface of one of the die members 72, 74.

The washer 50 is sized to be closely received within the inner diameter 16 of the outer collar 6 of stripper 4. The washer 50 should be sized such that the washer 50 will engage both the inner, radially oriented shoulder 26 of stripper 4 as well as the outer end surface 47 of the outer collar 42 of flange nut 40, as shown in FIG. 4.

The fastener 54 includes a head 56 having an outer end portion 58 oriented toward the stock strip 30 and an inner end portion 60 oriented away from the stock strip 30, as shown in FIG. 2. The head 56 includes a surface 62 that engages the surface 51 of the washer 50. The fastener 54 also includes a socket 68 and a threaded shank portion 66. The threaded shank portion 66 can include a self-locking nylon patch 64.

As best illustrated in FIGS. 2-4, the stock ejector assembly 2 is assembled by placing the spring member 32 over the outer collar 42 of flange nut 40 such that the inner end 38 of the spring member 32 engages surface 52 of the flange nut 40, as shown in FIG. 3. The hollow interior 34 also extends over the inner collar 8 of stripper 4 as illustrated in FIGS. 3 and 4, such that the outer end 36 of spring member 32 engages the outer radially oriented shoulder 24 of stripper 4. Washer 50 is inserted into the interior of the stripper 4 to engage the inner radially oriented shoulder 26 of stripper 4 as well as the outer end surface 47 of the flange nut 40, as shown in FIG. 4. The fastener 54 is inserted through the washer 50 such that the surface 62 of the head 56 of the fastener 54 engages the surface 51 of the washer 50 while the fastener 54 extends through the aperture 28 in the inner collar 8 of stripper 4. The threaded shank portion 66 of the fastener 54 engages the threaded portion 48 on the inside of the flange nut 40, as illustrated in FIG. 4.

Figure 5:
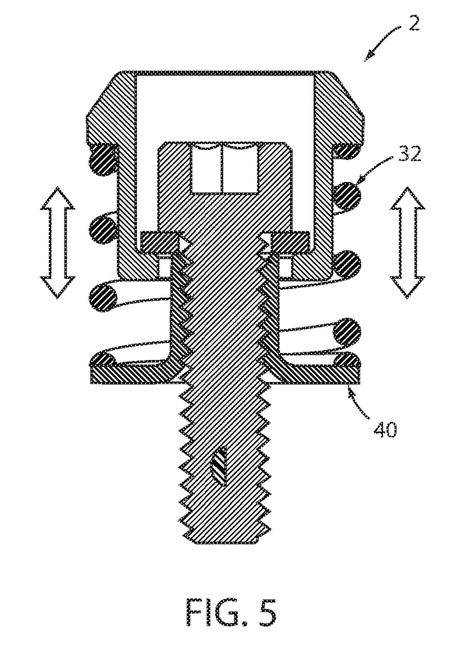
FIG. 5 is a vertical cross-sectional view of the stock ejector assembly with arrows showing the stripper in a raised position.
Figure 6:
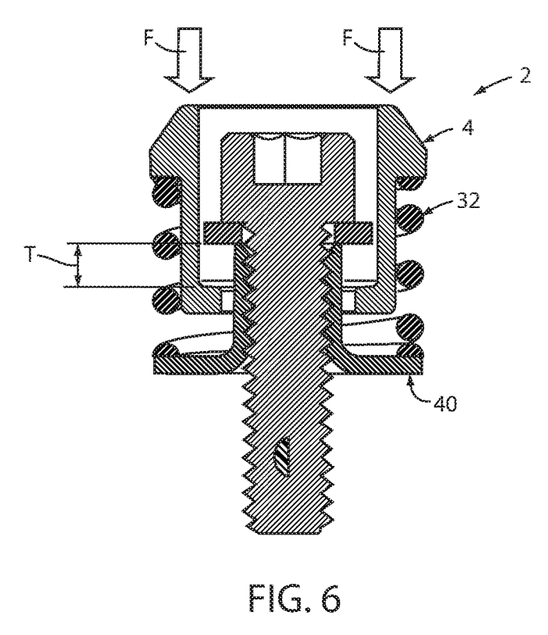
FIG. 6 is a vertical cross-sectional view of the stock ejector assembly showing the stripper when a force F is applied.

When the stock ejector assembly 2 is fully assembled, the spring member 32 is pre-loaded, as shown by the arrows in FIG. 5. When a load is applied, as shown by the arrows F in FIG. 6, the stripper 4 retracts and the pressure in the spring member 32 increases. The stripper 4 travels a distance T, as the spring member 32 is compressed due to the load.

Figure 8:
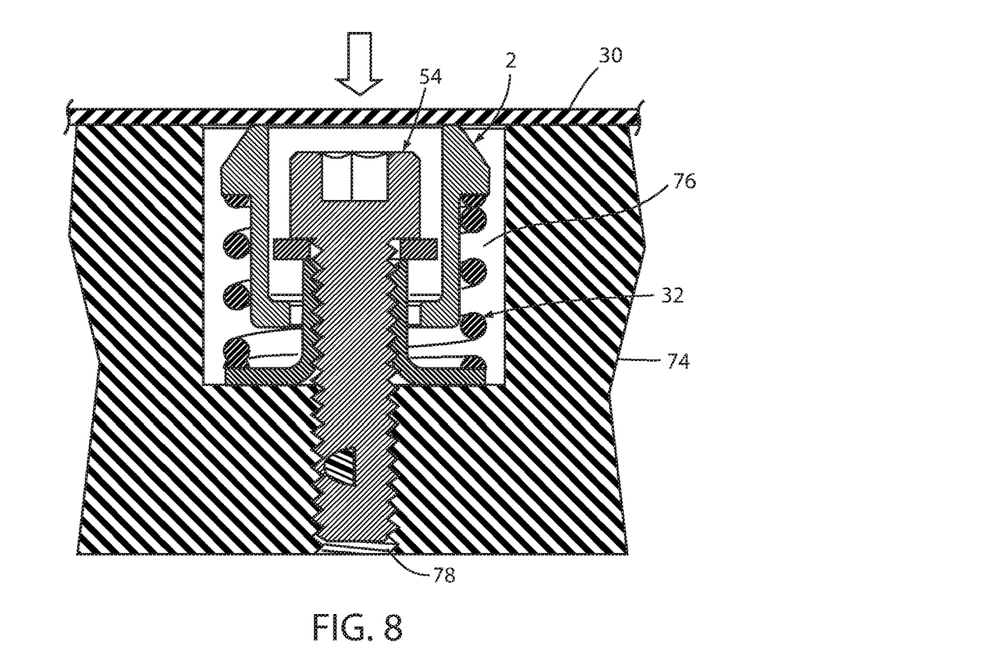
FIG. 8 is a vertical cross-sectional view of the stock ejector assembly once force has been applied and the stock is touching the lower die member.
Figures 9, 10:
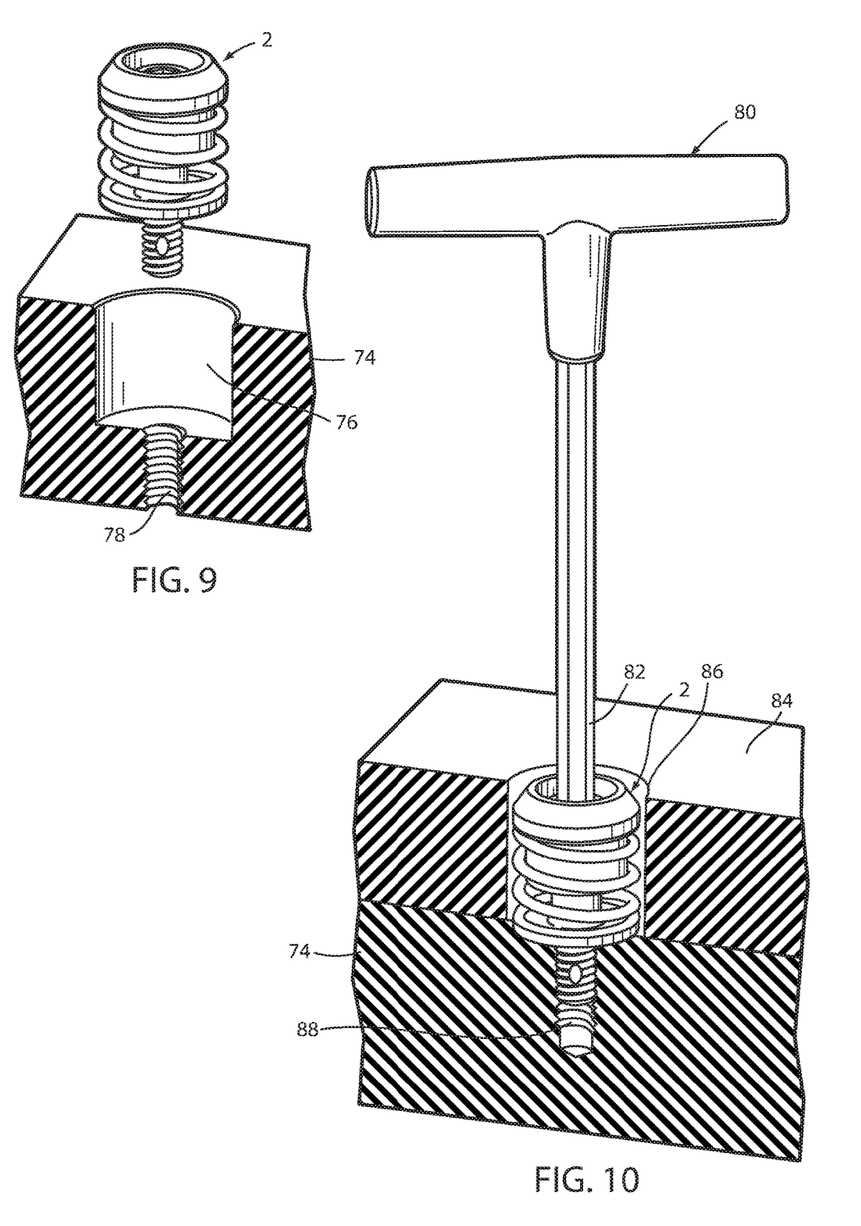
FIG. 9 is a perspective view of the stock ejector assembly prior to insertion into the lower die member.
FIG. 10 is a perspective view of a tool used to install the stock ejector assembly into a die member.

The stock ejector assembly 2 can be assembled to one of the die member 72, 74 of the metal forming die 70. As illustrated in FIGS. 7-9, an aperture 76 can be formed in the lower die member 74 to receive the stock ejector assembly 2. The generally flat surface 53 of flange nut 40 contacts a surface 55 of the aperture 76 when the stock ejector assembly 2 is inserted into the aperture 76. A threaded fastener aperture 78 is also machined, tapped, or otherwise formed in the die member 74. The fastener 54 is used to secure the stock ejector assembly 2 to the die member 74 by insertion of the fastener 54 into the fastener aperture 78. As illustrated in FIGS. 11 and 12, the stock ejector assembly 2 can also be used in the upper die member 72 of a die set 70.

As illustrated in FIG. 10, a standard hex tool 80 with a hex head 82 can be used to install the stock ejector assembly 2 into the die member 74. Also as illustrated in FIG. 10, a window mount 84 may be used to facilitate the installation of the stock ejector assembly 2 into the die member 74. The window mount 84 can have an aperture 86 that closely receives the stock ejector assembly 2, while the fastener 54 extends into a threaded aperture 88 in the die member 74. The window mount 84 may be fastened to the die member by the use of fasteners (not shown).

The stock strip 30 is received between the die members 72 and 74 when the die members 72, 74, converge, as illustrated in FIG. 11. When the die members converge, the spring member 32 is compressed. As shown in FIG. 12, when the die members 72, 74 diverge, the spring member 32 decompresses and pushes the stock strip 30 off of the surface of the die member 72. When the stock ejector assembly 2 is installed on the lower die member 74, the stock ejector assembly 2 not only breaks the oil or lubricant adhesion between the die member 74 and the stock strip 30, it also lifts the stock strip 30 for progression within a multi-station progressive metal forming die and/or removal of the finished part form the die assembly.

Figure 14:
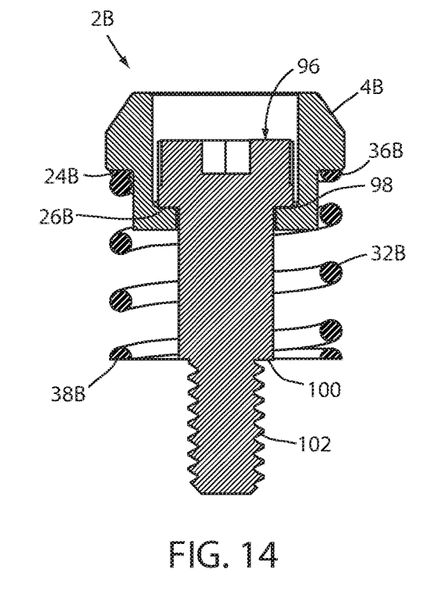
FIG. 14 is a vertical cross-sectional view of another embodiment of a stock ejector assembly embodying the present invention.

FIG. 14 illustrates another embodiment of a stock ejector assembly 2B. In this illustrated embodiment, no flange nut is used. A shoulder screw 96 engages the internal shoulder 26B of the stripper 4B. The outer portion 36B of the spring member 32B engages the outer shoulder 24B of the stripper 4B and the inner surface 38B engages a surface of the die member or under mount (not shown). The shoulder screw 96 has a flat surface 100 that will also engage the same surface that the inner surface 38B of the spring member 32B engages. The shoulder screw 96 has a threaded portion 102 that will be received in a corresponding threaded aperture in the die member or window mount.

Figure 15:
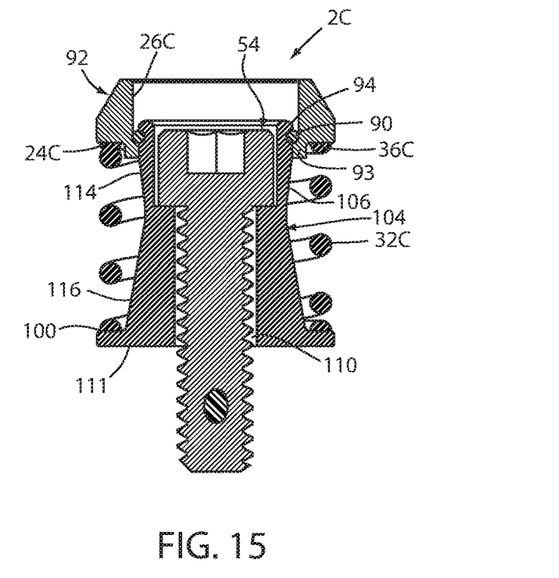
FIG. 15 is a vertical cross-sectional view of another embodiment of a stock ejector assembly embodying the present invention.

FIG. 15 illustrates another embodiment of a stock ejector assembly 2C. In this illustrated embodiment, the stripper 92 has a shorter inner collar portion 93 than the stripper shown in FIGS. 1-13. A fastener housing 104 has an outer portion 114 oriented toward the stock strip, and an inner portion 116 that is oriented away from the stock strip. These portions, 114 and 116, may be tapered, as shown in FIG. 15. A spring member 32C has an outer portion 36C that engages the outer shoulder 24C of the stripper 92. The fastener housing 104 has a groove 94 that retains a C-ring 90. The C-ring 90 will engage the inner shoulder 26C of the stripper 92. The fastener housing 104 has a fastener aperture 110. A fastener 54 is used to secure the stock ejector assembly 2C to a die member. When the stock ejector assembly 2C is installed, a surface 111 of the fastener housing 104 will engage a surface of the die member or window mount.

Figure 16:
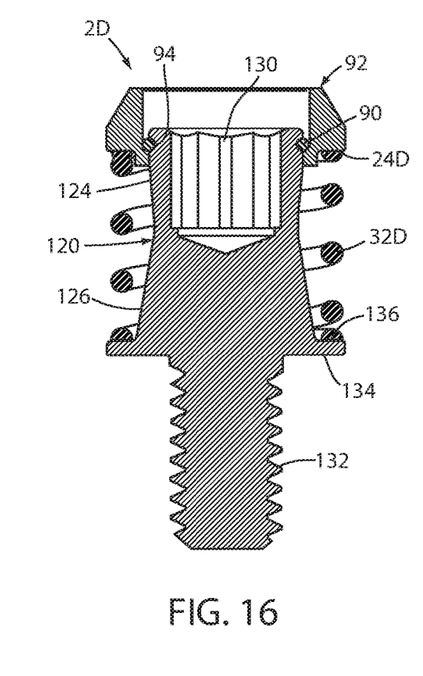
FIG. 16 is a vertical cross-sectional view of another embodiment of a stock ejector assembly embodying the present invention.

FIG. 16 illustrates another embodiment of a stock ejector assembly 2D. In this illustrated embodiment, an integral fastener/fastener housing 120 is used. The inner end 124 of the integral housing 120 is oriented toward the stock strip, while the outer end 126 is oriented away from the stock strip. One or more of the ends, 124 and 126, may be tapered. The integral housing 120 has a threaded shank portion 132 and a socket portion 130. The spring member 32D is received over the integral housing 120, and the outside shoulder 24D of the stripper 92. In the illustrated embodiment, the integral housing 120 has a groove 94 that receives a C-ring 90 that engages the inner shoulder of the stripper 92. when the stock ejector assembly 2D is installed, a surface 134 of the integral housing 120 will engage a surface of the die member or window mount. The threaded shank portion 132 of the integral housing 120 can be received in a corresponding threaded aperture in the die member.

Figure 17:
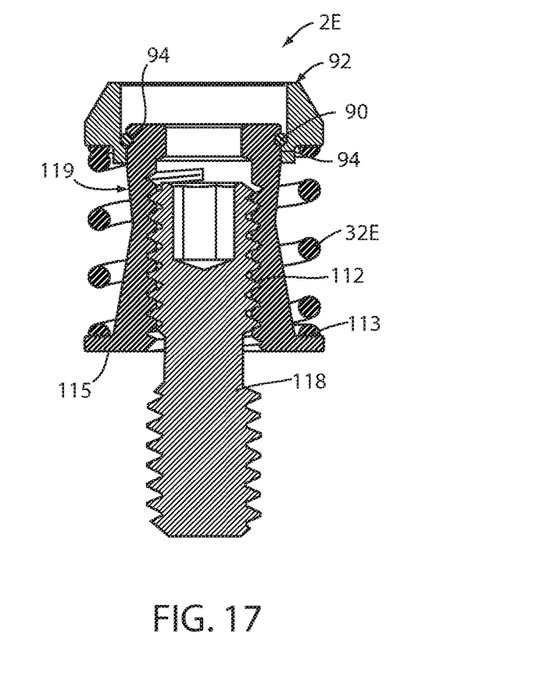
FIG. 17 is a vertical cross-sectional view of another embodiment of a stock ejector assembly embodying the present invention.

FIG. 17 illustrates another embodiment of the stock ejector assembly 2E. In this illustrated embodiment, a fastener housing 119 is used with a LH/RH threaded stud 118. the fastener housing 119 has a threaded portion 112 for receiving the LH/RH threaded stud 118. The spring member 32E engages a surface 113 of the fastener housing 119 and the outer shoulder of the stripper 92. The fastener housing 119 has a groove 94 that receives a C-ring 90 that engages the inner shoulder of the stripper 92. When the stock ejector assembly 2E is installed, a surface 134 of the integral housing 120 will engage a surface of the die member or window mount. The threaded shank portion 132 of the integral portion 120 can be received in a corresponding threaded aperture in the die member.

FIG. 17 illustrates another embodiment of a stock ejector assembly 2E. In this illustrated embodiment, a fastener housing 119 is used with a LH/RH threaded stud 118. The fastener housing 119 has a threaded portion 112 for receiving the LH/RH threaded stud 118. The spring member 32E engages a surface 113 of the fastener housing 119 and the outer shoulder of the stripper 92. The fastener housing 119 has a groove 94 that receives a C-ring 90 that engages the inner shoulder of the stripper 92. When the stock ejector assembly 2E is installed, a surface 115 of the fastener housing 119 will engage a surface of the die member or window mount, while a portion of the LH/RH threaded stud 118 is received in a corresponding threaded aperture in the die member.

In the illustrated embodiments (FIGS. 15-17) utilizing the C-ring 90, the C-ring 90 will engage the inner shoulder 24 of the stripper 92 when there is no force applied to the stripper 92. When the die members converge and a force is applied to the stripper 92 and the spring member 32 is compressed, the stripper 92 will move toward the die member and the C-ring 90 will not engage the inner shoulder 24 of the stripper 92. The tapered surface of the housing (104, 120, and 119) will help reseat the stripper 92 on the C-ring 90 when the die members diverge and the spring member 32 decompresses. While these illustrated embodiments show a C-ring 90, any other suitable ring can be used, such as an O-ring, that is received by the groove 94.

The term "die member" as used herein refers to any portion of a metal forming die or die set, including, but not limited to, an upper die member or a die shoe, a lower die member or a die shoe, and other die components, whether stationary or reciprocating, including a reciprocating pressure pad, and the like. In the illustrated examples, the stock ejector assembly 2, 2B, 2C, 2D, and 2E can be mounted in any die member. The stock ejector assemblies 2, 2B, 2C, 2D, and 2E can be mounted in other types of die members and/or components and in a variety of different positions and orientations, as will be appreciated by those skilled in the art. In addition, the stock ejector assemblies 2, 2B, 2C, 2D, and 2E can be used in a single stage die assembly.

Stock ejector assemblies 2, 2B, 2C, 2D, and 2E have an uncomplicated construction with relatively few components and are therefore quite durable and economical to manufacture. Multiple components of the stock ejector assembly 2, 2B, 2C, 2D, and 2E may be formed from a single piece of rigid material. For example, the stripper 4, 92 may have a one-piece construction made from a solid bar of material, such as steel. The fasteners and optional window mount attachment of the stock ejector assemblies to an associated die member provides quick and easy installation and removal of the stock ejector assemblies. The spring member 32 and the stock ejector assemblies 2, 2B, 2C, 2D, and 2E are backed up or axially supported by the die member itself for greater strength and convenience. Stock ejector assemblies 2, 2B, 2C, 2D, and 2E positively separate the stock strip from the die during operation of the metal forming die, and provide a very compact, low-profile shape that can be used at various locations and orientations on various die members. The installation of the stock ejector assemblies can be achieved with simple machining so as to reduce the installation time and cost. The shape of the assemblies can be configured so as to accommodate many different applications and users.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a multi-station progressive metal forming die having at least two mutually converging and diverging die members between which an elongate stock strip is shifted longitudinally to form parts from the stock strip, the improvement of a stock ejector assembly, comprising:
  a stripper with an outer collar portion with an outer end surface oriented toward the stock strip and a first sidewall with a first outer width, an inner collar portion with an inner end surface oriented away from the stock strip and a second sidewall with a second outer width which is less than said first outer width of said first sidewall of said outer collar portion and defines a shoulder therebetween; wherein:
    said outer collar portion has a first inner width;
    said inner collar portion has a second inner width which is less than said first inner width of said outer collar portion and defines an inner shoulder therebetween;
    said first outer width and said first inner width of said outer collar portion of said stripper form a surface for contacting the stock strip;
  a flange nut having an outer end portion that is oriented toward the stock strip, an inner end portion that is oriented away from the stock strip, and a fastener aperture extending from the outer end portion through the inner end portion;
  a spring member having a generally hollow interior that is received over said outer end portion of the flange nut and the inner collar portion of the stripper, an outer end oriented toward the stock strip that engages the shoulder of the stripper, and an opposite inner end oriented away from the stock strip that engages a surface of the inner end portion of the flange nut; and
  a fastener that secures the assembly to one of the die members.

2. A metal forming die as set forth in claim 1, including: a washer that engages the shoulder of the stripper.

3. A metal forming die as set forth in claim 2, wherein: said inner collar portion of the stripper includes an aperture.

4. A metal forming die as set forth in claim 3, wherein: said fastener includes a head having an outer end portion oriented towards the stock strip and an inner end portion oriented away from the stock strip and a threaded shank portion that extends from said inner end portion of the head of the fastener.

5. A metal forming die as set forth in claim 4, wherein: at least a portion of said fastener aperture in said flange nut is threaded.

6. A metal forming die as set forth in claim 5, wherein: a portion of said outer end portion of the flange nut extends into the aperture of the inner collar portion of the stripper and the inner end portion of the head of the fastener engages a surface of said washer while the threaded shank portion of the fastener extends through the fastener aperture in the flange nut, and into a threaded aperture formed in said one die member to secure the assembly to said one die member.

7. A metal forming die as set forth in claim 1, wherein: said outer collar portion of said stripper includes a taper.

8. A stock ejector assembly for metal forming dies having at least two mutually converging and diverging die members between which parts are formed from a stock strip, comprising:
  a stripper with an outer collar portion with an outer end surface oriented toward the stock strip and a first sidewall with a first outer width, an inner collar portion with an inner end surface oriented away from the stock strip and a second sidewall with a second outer width which is less than said first outer width of said first sidewall of said outer collar portion and a shoulder therebetween; wherein:
    said outer collar portion has a first inner width;
    said inner collar portion has a second inner width which is less than said first inner width of said outer collar portion and defines an inner shoulder therebetween;
    said first outer width and said first inner width of said outer collar portion of said stripper form a surface for contacting the stock strip;
  a flange nut having an outer end portion that is oriented toward the stock strip, an inner end portion that is oriented away from the stock strip, and a fastener aperture extending from the outer end portion through the inner end portion;
  a spring member having a generally hollow interior that is received over said outer end portion of the flange nut and the inner collar portion of the stripper, an outer end oriented toward the stock strip that engages the shoulder of the stripper, and an opposite inner end oriented away from the stock strip that engages a surface of the inner end portion of the flange nut; and
a fastener.

9. A stock ejector assembly as set forth in claim 8, including:
a washer that engages the shoulder of the stripper.

10. A stock ejector assembly as set forth in claim 9, wherein:
said inner collar portion of the stripper includes an aperture that is formed by said second inner width of the inner collar portion.

11. A stock ejector assembly as set forth in claim 10, wherein:
said fastener includes a head having an outer end portion oriented towards the stock strip and an inner end portion oriented away from the stock strip and a threaded shank portion that extends from said inner end portion of the head of the fastener.

12. A stock ejector assembly as set forth in claim 11, wherein:
at least a portion of said fastener aperture in said flange nut is threaded.

13. A stock ejector assembly as set forth in claim 12, wherein:
a portion of said outer end portion of the flange nut extends into the aperture of the inner collar portion of the stripper and the inner end portion of the head of the fastener engages a surface of said washer while the threaded shank portion of the fastener extends through the fastener aperture in the flange nut, and into a threaded aperture formed in said one die member to secure the assembly to said one die member.

14. A stock ejector assembly as set forth in claim 8, wherein:
said outer collar is tapered to a surface for contacting the stock strip.

15. In a method for making a multi-station progressive metal forming die having at least two mutually converging and diverging die members between which an elongate stock strip is shifted longitudinally to form parts from the stock strip, with the improvement of at least one stock ejector assembly, comprising:
forming a stripper with an outer collar portion with an outer end surface oriented toward the stock strip and a first sidewall with a first outer width, an inner collar portion with an inner end surface oriented away from the stock strip and a second sidewall with a second outer width which is less than said first outer width of said first sidewall of said outer collar portion to define a shoulder therebetween, including:
forming said outer collar portion with a first inner width;
forming said inner collar portion with a second inner width which is less than said first inner width of said outer collar portion to define an inner shoulder therebetween, and an aperture that is formed by said second inner width of the inner collar portion;
selecting a flange nut with an outer end portion that is oriented toward the stock strip, an inner end portion that is oriented away from the stock strip, and a fastener aperture extending from the outer end portion through the inner end portion;
selecting a spring member with a generally hollow interior, an outer end oriented toward the stock strip, and an opposite inner end oriented away from the stock strip;
inserting said spring member over said outer end portion of the flange nut and the inner collar portion of the stripper with the outer end of the spring member engaging the outer shoulder of the stripper and the inner end of the spring member engaging a surface of the inner end portion of the flange nut;
selecting a fastener with a head having an outer end portion oriented towards the stock strip and an inner end portion oriented away from the stock strip and a threaded shank portion that extends from said inner end portion of the head of the fastener;
inserting the fastener through the fastener aperture in the flange nut; and
securing the stock ejector assembly to one die member by securing the fastener into a threaded aperture formed in said one die member.

16. A method for making a multi-station progressive metal forming die as set forth in claim 15, wherein:
said stripper has a one-piece construction formed from a solid bar of rigid material.

17. A method for making a multi-station progressive metal forming die as set forth in claim 15, wherein:
said stripper forming step includes forming a tapered surface on said outer collar of said stripper to form a surface for contacting the stock strip.

18. A method for making a multi-station progressive metal forming die as set forth in claim 15, including:
selecting a washer with an aperture that has a width slightly larger than the width of the shank portion of the fastener and an outer width that can be closely received in the first inner width of the outer collar portion of the stripper;
inserting the washer into the stripper and on the inner shoulder of the stripper before the fastener inserting step so that the fastener is also inserted through the washer aperture during the fastener inserting step.

19. A method for making a multi-station progressive metal forming die as set forth in claim 18, wherein:
the flange nut selecting step includes selecting a flange nut with a threaded fastener aperture.

20. A method for making a multi-station progressive metal forming die as set forth in claim 19, wherein:
the outer end portion of the fastener includes a socket.

* * * * *